United States Patent
Vongseng

(10) Patent No.: US 7,359,610 B2
(45) Date of Patent: Apr. 15, 2008

(54) CABLE MANAGER INCLUDING NESTABLE RADIUS LIMITER

(75) Inventor: Soutsada Vongseng, Chanhassen, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/397,922

(22) Filed: Apr. 3, 2006

(65) Prior Publication Data

US 2007/0230887 A1    Oct. 4, 2007

(51) Int. Cl.
*G02B 6/00* (2006.01)
(52) U.S. Cl. .............. 385/135; 385/134; 385/136; 385/137; 439/501
(58) Field of Classification Search ........... 385/135; 439/501
See application file for complete search history.

(56) References Cited

U.S. PATENT DOCUMENTS

| 6,438,310 | B1* | 8/2002 | Lance et al. ............ 385/135 |
| 6,468,112 | B1 | 10/2002 | Follingstad et al. |
| 6,532,332 | B2 | 3/2003 | Solheid et al. |
| 7,059,895 | B2* | 6/2006 | Murano ............... 439/501 |
| 2002/0097973 | A1 | 7/2002 | Petri |
| 2002/0197044 | A1 | 12/2002 | Daoud et al. |
| 2003/0119385 | A1 | 6/2003 | Elliot et al. |
| 2005/0281256 | A1 | 12/2005 | Vongseng et al. |

OTHER PUBLICATIONS

U.S. Appl. No. 11/069,886, filed Feb. 28, 2005, 18 pages (admitted to be prior art as of the filing date Apr. 3, 2006).
Value-Added Module System, ADC Telecommunications, 4 pages, (Jun. 1998).

* cited by examiner

*Primary Examiner*—Michelle Connelly-Cushwa
*Assistant Examiner*—Chad H Smith
(74) *Attorney, Agent, or Firm*—Merchant & Gould P.C.

(57) ABSTRACT

A cable radius limiter having a radius limiting surface that prevents damage to cables due to excessive bending. The cable radius limiter includes mounting structure and cable retaining structure arranged such that the limiter can be operably oriented and mounted to a mounting bracket in both a first mounting orientation and a second mounting orientation. Two radius limiters can be mounted together to form a cable spool.

12 Claims, 8 Drawing Sheets

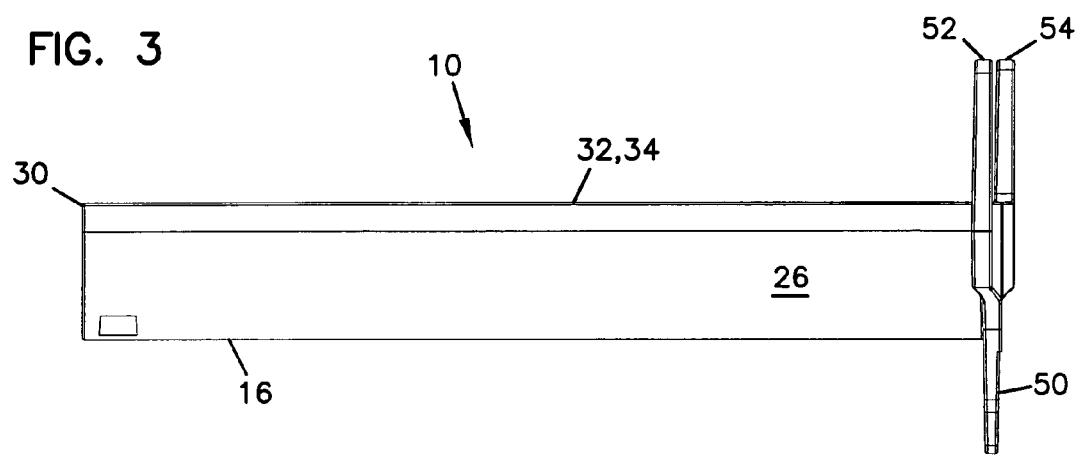
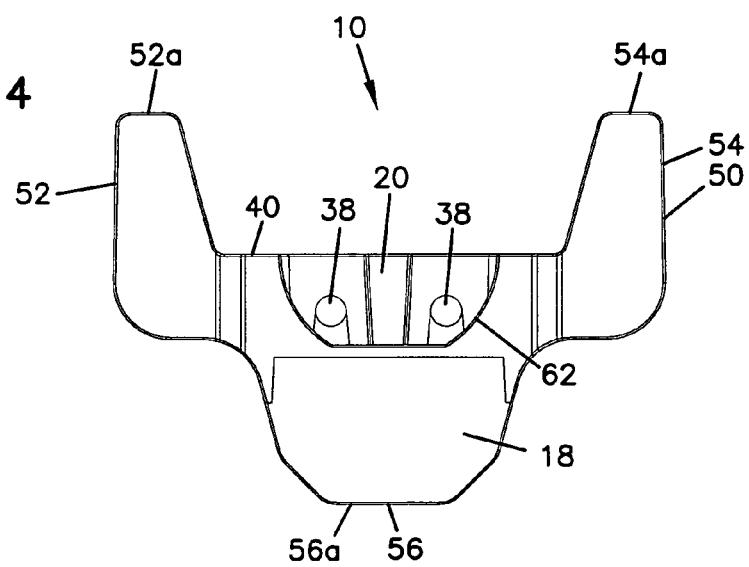
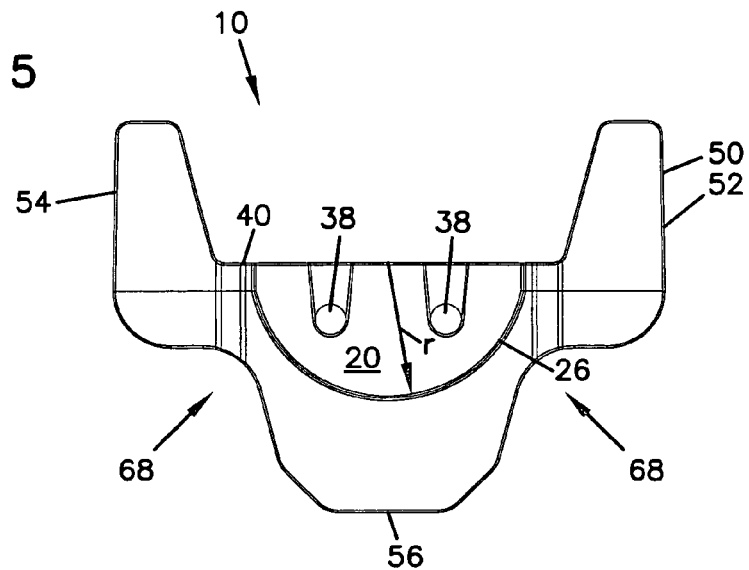

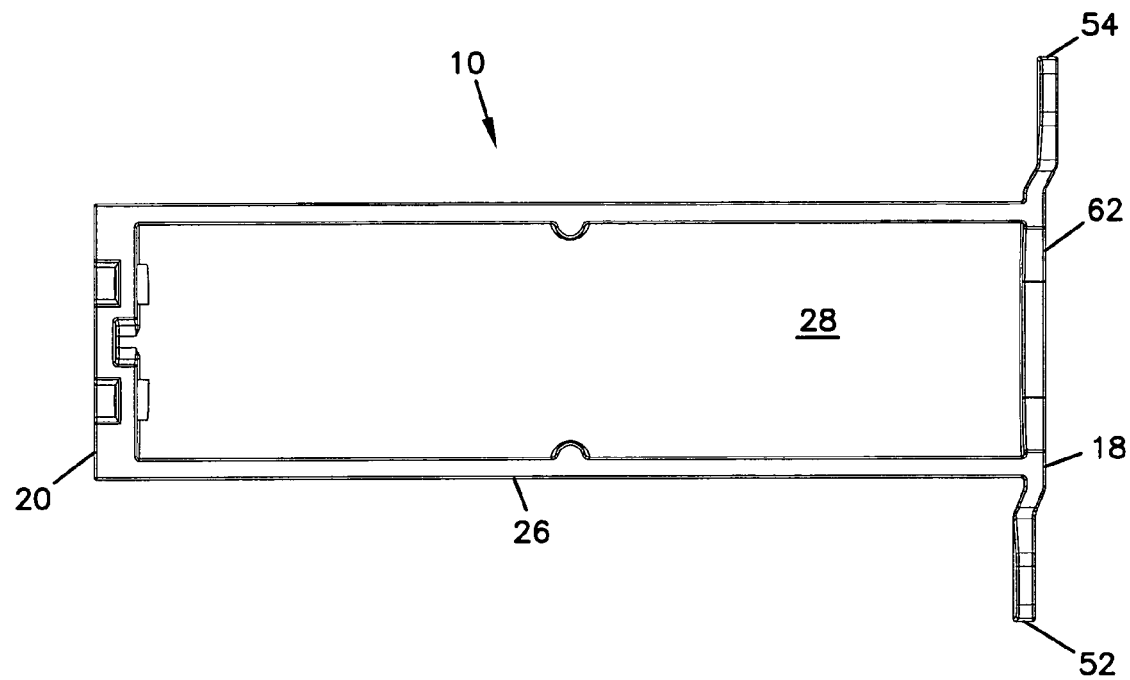
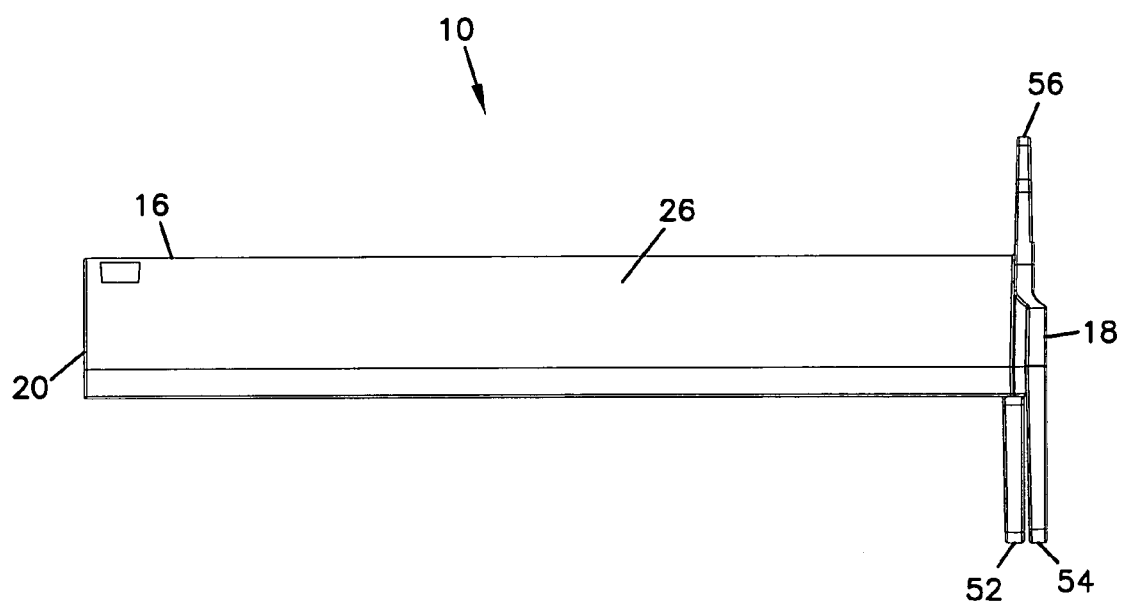

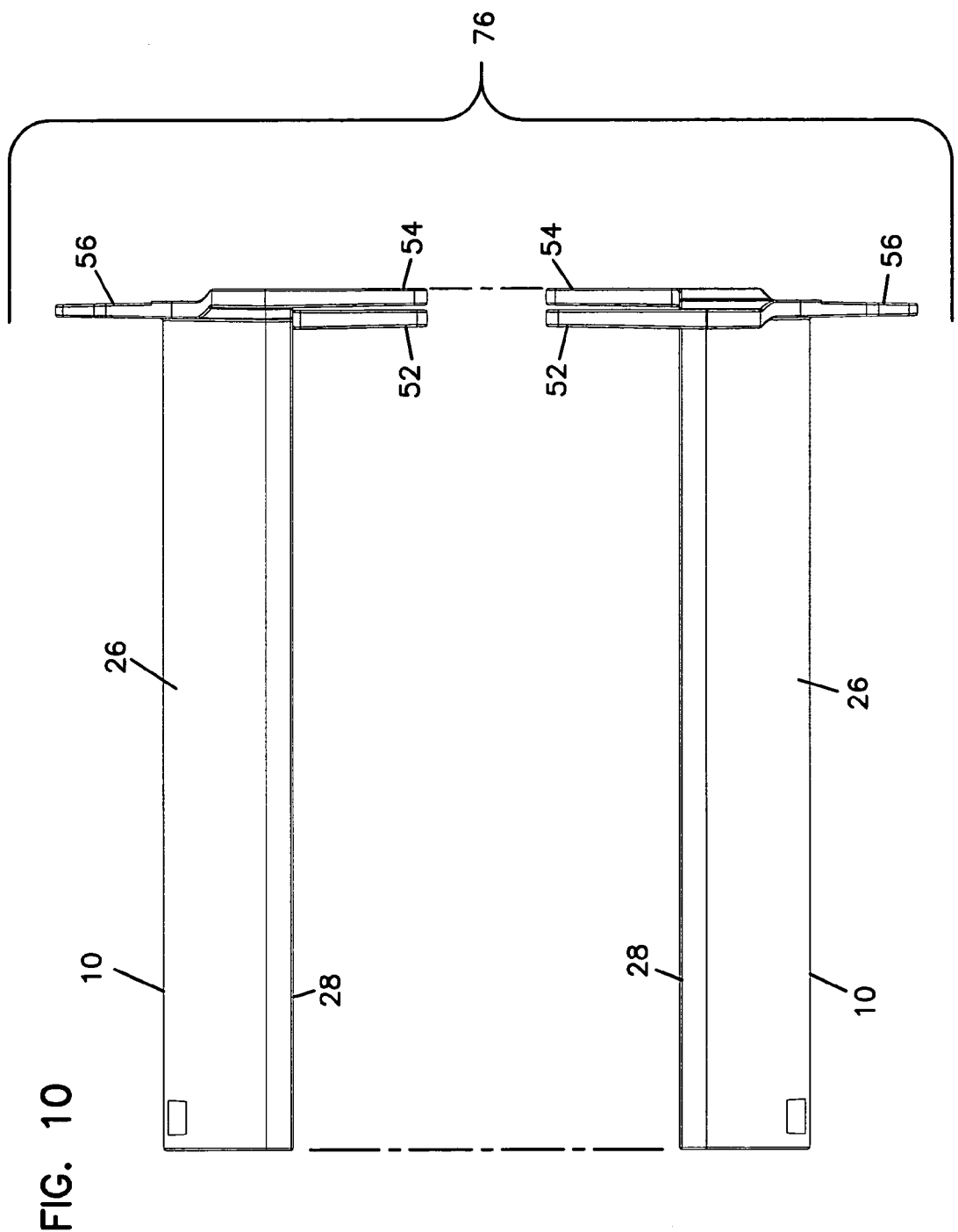

CABLE MANAGER INCLUDING NESTABLE RADIUS LIMITER

TECHNICAL FIELD

The present invention relates generally to devices and methods for enhancing cable management of a telecommunications system. More particularly, the present invention relates to a radius limiter arrangement for use in telecommunications systems.

BACKGROUND

Telecommunications systems commonly include cables (e.g., fiber optic cables or copper twisted pair cables) for interconnecting pieces of telecommunications equipment. Telecommunication racks typically hold a variety of different pieces of telecommunications equipment. Often thousands of cables are used to interconnect the various pieces of telecommunications equipment mounted on the racks.

Because of the large number of cables associated with telecommunications equipment, cable management is crucial. Cable management involves organizing cables so that the cables run or lie in an orderly manner. Because telecommunication systems often have different cable routing requirements, adaptability of the devices used to manage and organize cables is desirable. Cable management also involves preventing damage to the cables, such as unnecessary or excessive displacement of fiber optic cables. Unnecessary or excessive bending can damage cables. For example, the bending of the fibers can cause attenuation and loss of signal strength, which can even result in the fiber breaking and a complete loss of signal transmission through the fiber.

In general, cable management improvement has been sought, generally to efficiently and effectively manage cables by providing a device that prevents cable damage and is also adaptable to a variety of telecommunications applications.

SUMMARY

One aspect of the present invention relates to a cable radius limiter having mounting structure and cable retaining structure arranged such that the limiter can be operably oriented in both a first mounting orientation and a second mounting orientation. Another aspect of the present invention relates to a cable radius limiter arrangement for managing cable of a telecommunications system. The arrangement includes two cable radius limiters mounted back to back to form a cable spool.

A variety of aspects of the invention are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are exemplary and explanatory only, and are not restrictive of the claimed invention.

BRIEF DESCRIPTION OF THE DRAWINGS

FIG. 3 is a side view of the radius limiter of FIG. 2.

FIG. 4 is a first end view of the radius limiter of FIG. 2.

FIG. 5 is an opposite end view to the end view of FIG. 4 of the radius limiter of FIG. 2.

FIG. 6 is a top view of the radius limiter of FIG. 2.

FIG. 8 is a side view of the radius limiter of FIGS. 2-6, shown in an opposite orientation to the orientation shown in FIGS. 2-6.

FIG. 10 shows two radius limiters positioned back to back in order to assemble a cable management spool.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
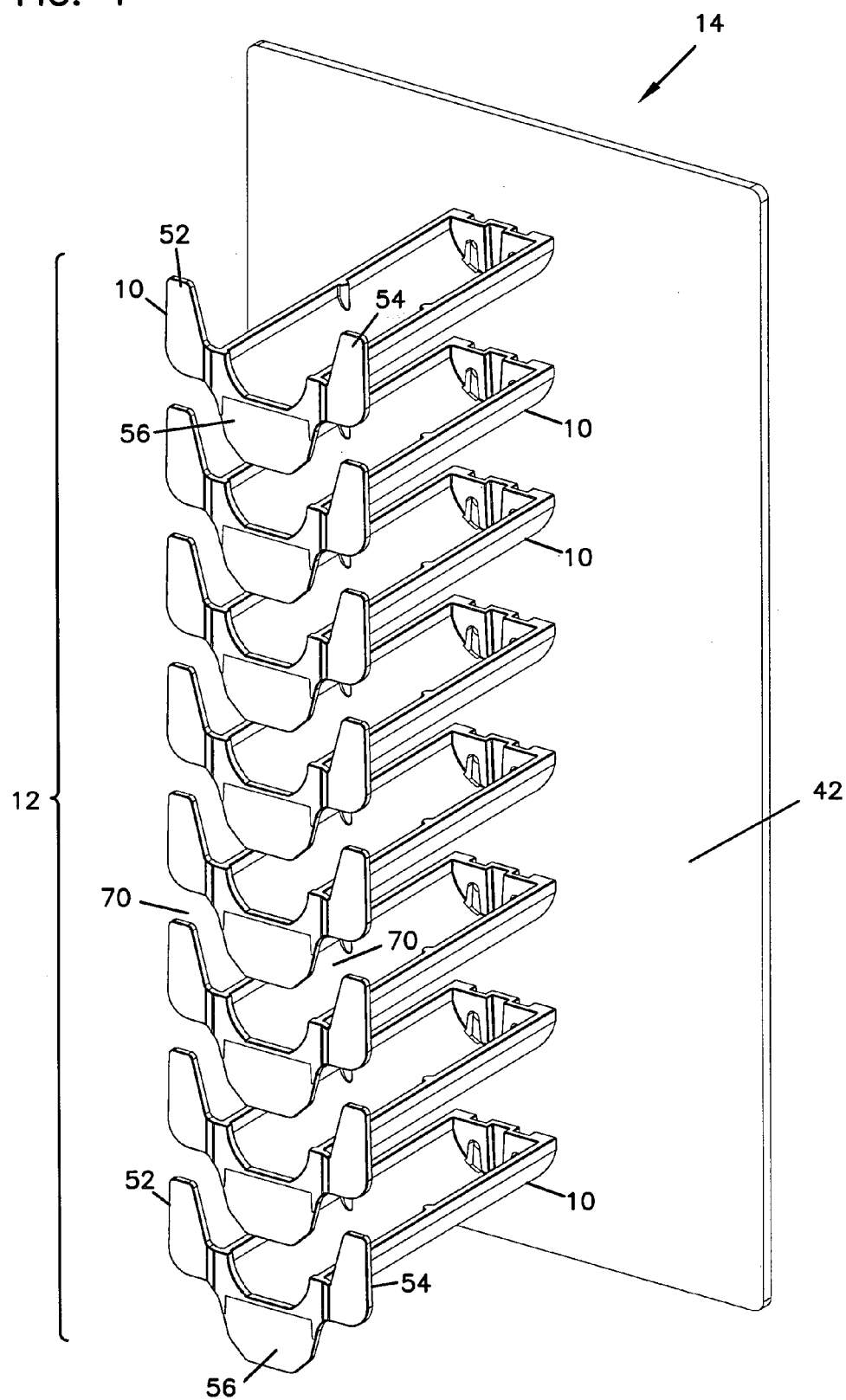
FIG. 1 is a front perspective view of a cable management panel including a plurality of radius limiters in a stacked arrangement in a first orientation.
Figure 2:
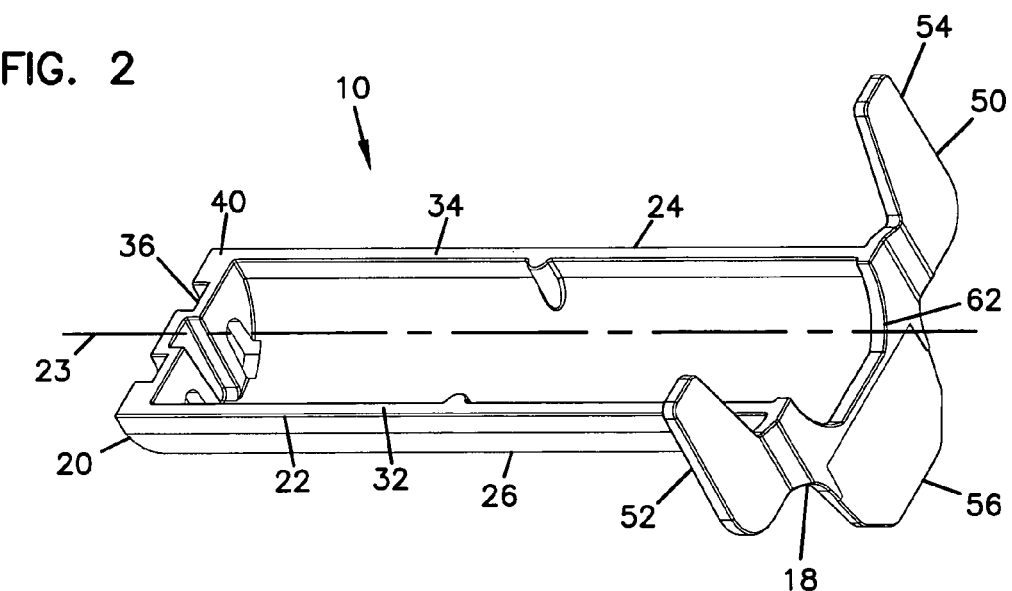
FIG. 2 is a perspective view of one the radius limiters in the panel of FIG. 1.

FIG. 1 illustrates one embodiment of a radius limiter 10 for use in managing telecommunications cables, including fiber optic cables. A plurality of radius limiters 10 can be arranged in a stack 12 to form a cable management panel 14 for managing a plurality of fiber optic cables. Referring now to FIGS. 2-6 in addition to FIG. 1, radius limiter 10 includes a body 16 having a front 18 and a rear 20. Body 16 has a first side 22 and an opposite second side 24. A first surface 26 extends from first side 22 to second side 24. As shown, first surface 26 is generally curved in a semi-circular shape extending between front 18 and rear 20. Second surface 28 also extends from first side 22 to second side 24 and defines a cavity.

Body 16 defines a longitudinal axis 23 extending between front 18 and rear 20. First surface 26 extends from front 18 to rear 20 to define a bend radius protection feature for cables laid across radius limiter 10 in a direction generally transverse to axis 23. In the preferred embodiment, first surface 26 is defined by a radius r. As shown, an edge 30 of rear 20, and edges 32, 34 of sides 22, 24, define a planar shape to a base 40 of radius limiter 10.

Radius limiter 10 includes mounting structure 36 for mounting radius limiter 10 to a panel or other surface. In the illustrated embodiment, mounting structure 36 includes one or more holes 38 adjacent rear 20 of body 16. Holes 38 can receive fasteners for fastening rear 20 to a panel element 42.

Radius limiter 10 includes cable retaining structure 50 adjacent to front 18 for retaining cables adjacent to first surface 26. In the illustrated embodiment, cable retaining structure includes first and second tabs 52, 54 extending in a first direction, and a third tab 56 extending in an opposite direction. Third tab 56 is generally centered relative to first surface. First and second tabs 52, 54 are generally positioned adjacent to first and second sides 22, 24, respectively. In the illustrated embodiment, tabs 52, 54, 56 form distal ends of a front plate 51. Distal tips 52a, 54a are on one side of a plane defined by base 40, and distal tip 56a is on an opposite side (see FIG. 4, for example).

Front 18 of body 16 of radius limiter 10 defines a front opening 62 which provides access to rear 20, such as for accessing fasteners positioned in holes 38 to mount or remove radius limiter with respect to panel element 42. Other methods of connecting radius limiter 10 to panel element 42 are anticipated, including snaps.

Figure 7:
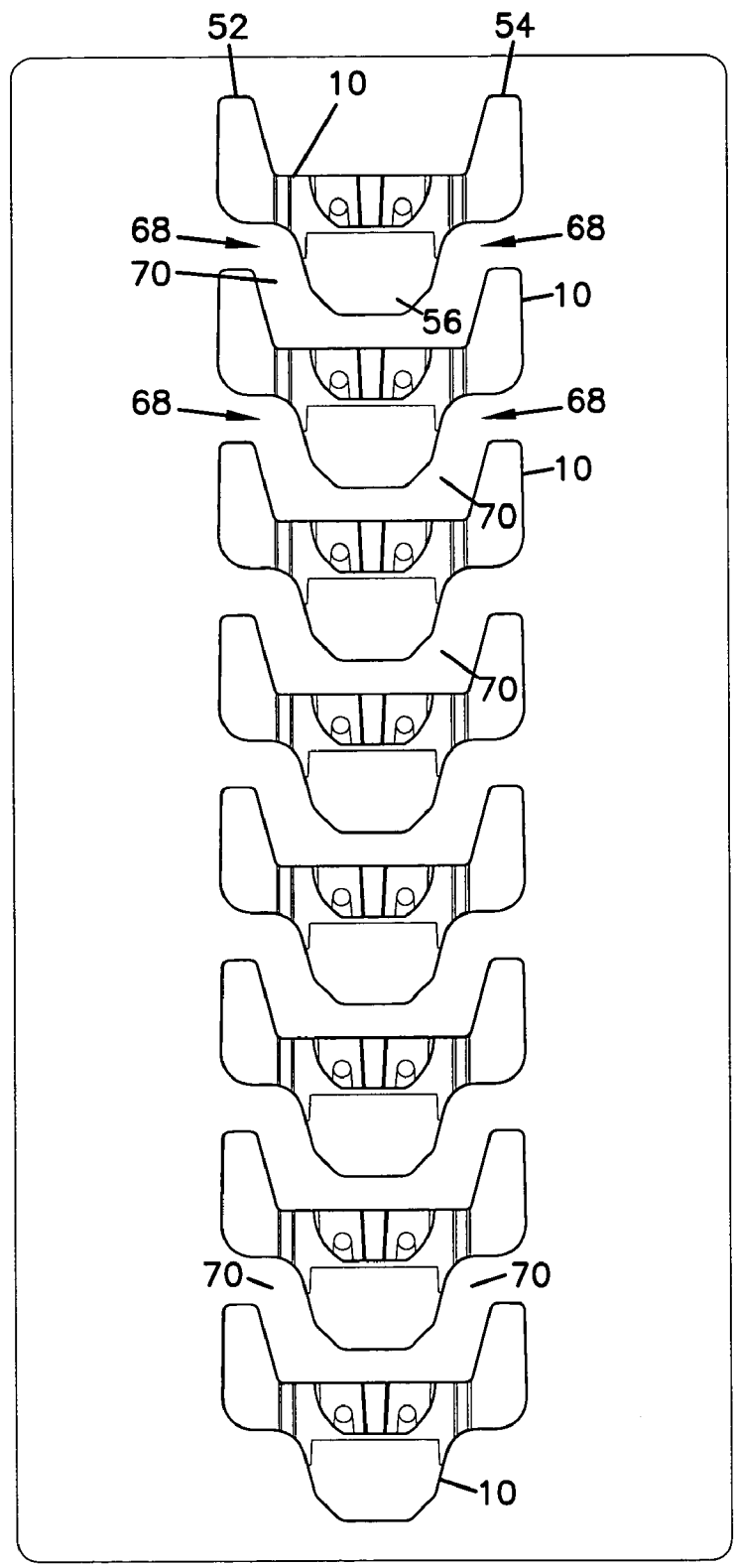
FIG. 7 is an end view of the panel of FIG. 1.

Referring now to FIG. 7, the cable retaining structures 50 are shown wherein tabs 52, 54 of one radius limiter 10 nests into recesses 68 formed by the adjacent radius limiter 10 on opposite sides of third tab 56. To add and remove cables from radius limiters 10, cables are passed through gaps 70. Tabs 52, 54, 56 keep other cables in place on radius limiters 10 when other cables are accessed.

Figure 9:
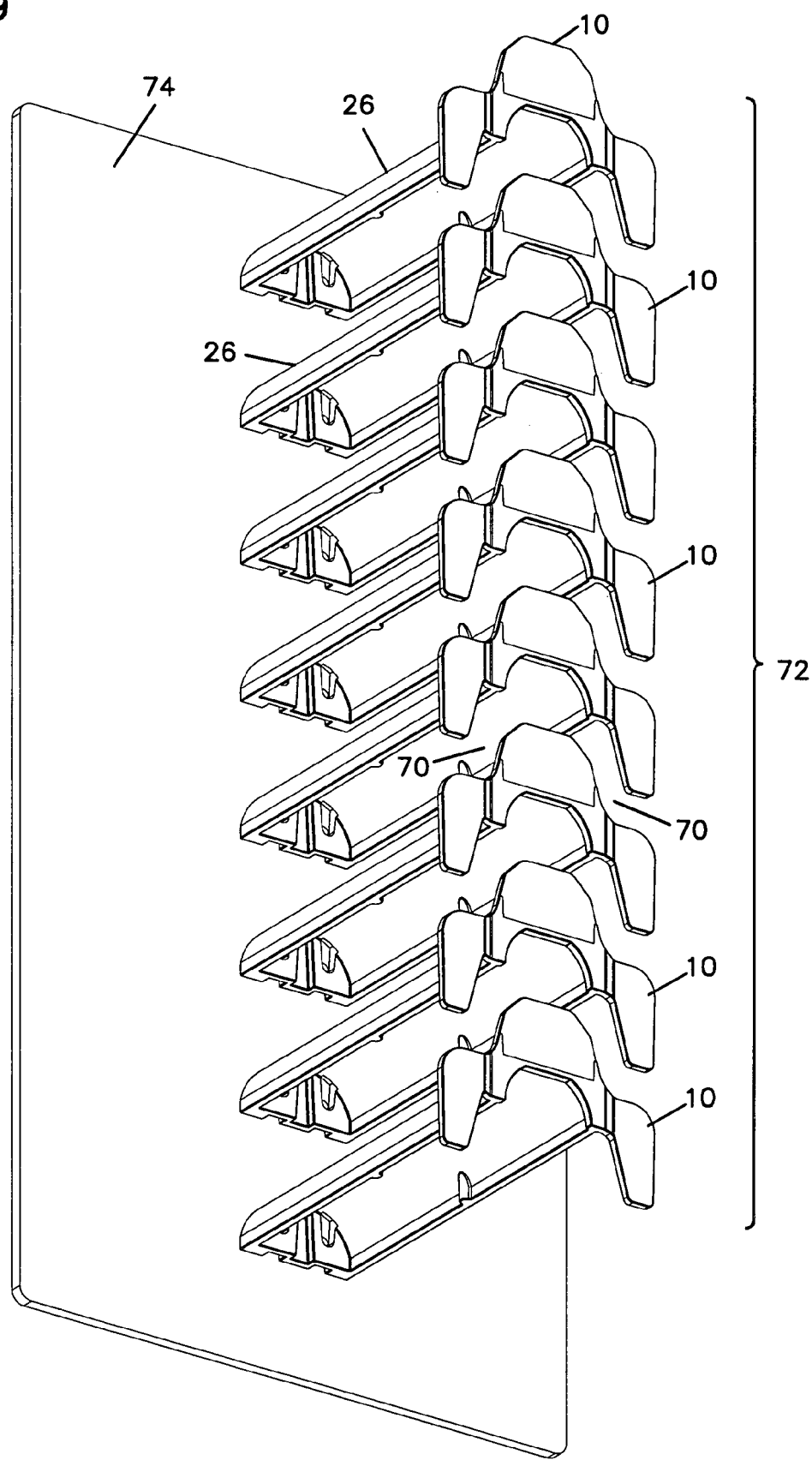
FIG. 9 is a front perspective view of a cable management panel including a plurality of the radius limiters of FIG. 8 in a stacked arrangement in the opposite orientation.

Referring now to FIG. 8, radius limiter 10 can be used where first surface 26 faces vertically upwardly, instead of facing vertically downwardly as shown in panel 14 of FIG. 1. FIG. 9 shows a stack 72 of radius limiters 10 on a cable management panel 74 wherein the first surfaces 26 face vertically upwardly. Radius limiters 10 can also be used where first surfaces 26 face other directions including horizontally.

Figure 11:
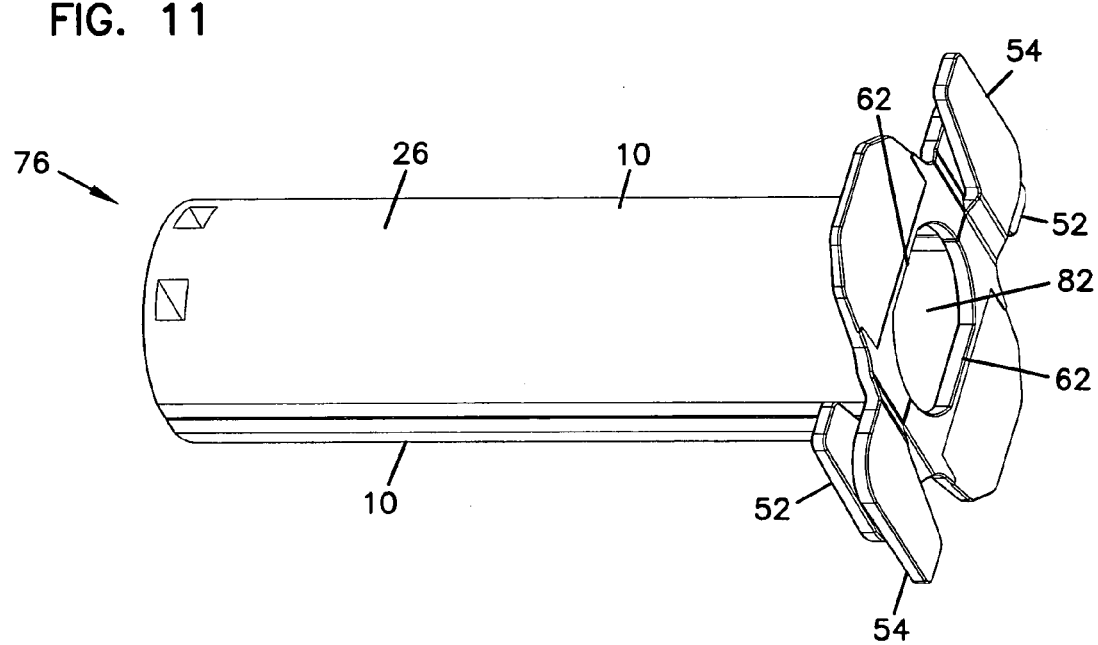
FIG. 11 is a perspective view showing the cable management spool formed by mounting the two radius limiters back to back as shown in FIG. 10.

Referring now to FIG. 10, two radius limiters 10 can be nested together back to back, i.e. where second surfaces 28 face each other. FIG. 11 shows the resulting combination of two radius limiters 10 nested back to back to form a spool 76 wherein first surfaces 26 allow a cable to be wrapped completely around the resulting structure. To enable nesting as shown in FIG. 11, first and second tabs 52, 54 are offset relative to one another as is visible in FIGS. 3 and 6. In the illustrated embodiment, tabs 52, 54 are each offset from tab 56, one forwardly and one rearwardly. Front openings 62 of each radius limiter cooperate to form an opening 82 which is useful for accessing holes 38 to mount or remove each radius limiter 10 from the panel element.

Figure 12:
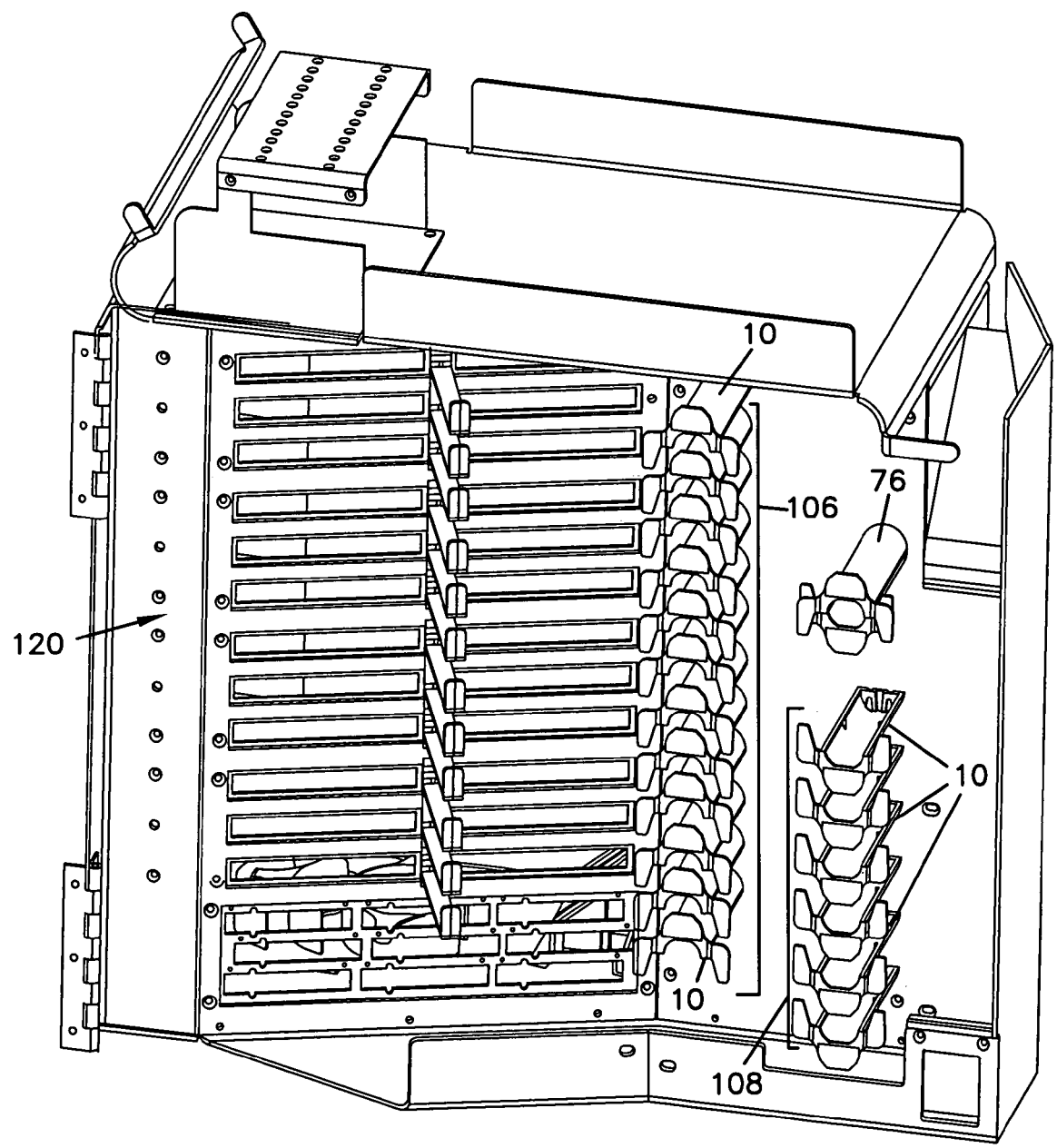
FIG. 12 is a front perspective view of a cable management panel including similar stacked arrangements to the arrangements of FIGS. 1 and 9, and one cable management spool of FIG. 11.

Referring now to FIG. 12, a cable management panel 104 is shown including a first stack 106 of radius limiters 10 with the first surfaces 26 facing upwardly. A second stack 108 of radius limiters 10 is provided with the first surfaces 26 facing downwardly. Two radius limiters 10 are mounted back to back to form a spool 76. Cables extending to cable termination area 120 can be managed by spool 76, one or more selected radius limiters 10 in second stack 108, and one or more selected radius limiters 10 in first stack 106.

The above specification provides a complete description of the cable management assembly, system, and method. Since many embodiments of the invention can be made without departing from the spirit and scope of the invention, the invention resides in the claims hereinafter appended.

What is claimed is:

1. A cable radius limiter comprising:
   a first body extending from a rear end to a front end and defining a longitudinal axis, the first body having first and second opposite sides;
   the first body including a curved surface extending from the first side to the second side;
   the front end of the first body including first and second tabs extending transversely to the longitudinal axis and extending in the same direction;
   the front end of the first body including a third tab extending transversely to the longitudinal axis and in an opposite direction to the first and second tabs;
   wherein the front end of the first body defines notches formed between each of the first and second tabs and the third tab; and
   a second body having an identical configuration to that of the first body; the first and second bodies being matable to form a spool wherein the longitudinal axes are parallel, and the curved surfaces face in opposite directions.

2. The cable radius limiter of claim 1, wherein the rear end of the first body defines a plurality of fastener holes.

3. The cable radius limiter of claim 2, wherein the front end of the first body defines an opening allowing for insertion of a tool to access fasteners in the fastener holes.

4. The cable radius limiter of claim 1, wherein the curved surface of the first body is defined by a radius.

5. The cable radius limiter of claim 1, wherein the first and second tabs of each of the first and second bodies overlap one another.

6. The cable radius limiter of claim 1, further comprising a plurality of third bodies having identical configurations to the first and second bodies, wherein all of the first, second, and third bodies are mounted to a panel, wherein the first and second bodies are mounted to form a spool wherein the longitudinal axes are parallel, and the curved surfaces face in opposite directions, and wherein the third bodies are mounted in a stack with the longitudinal axes parallel to one another, and the curved surfaces all face in the same direction.

7. A cable radius limiter comprising:
   first and second bodies, each body extending from a rear end to a front end and defining a longitudinal axis, each body having first and second opposite sides;
   each body including a curved surface extending from the first side to the second side;
   the front end including first and second tabs extending transversely to the longitudinal axis and extending in the same direction;
   the front end including a third tab extending transversely to the longitudinal axis and in an opposite direction to the first and second tabs;
   wherein the first and second bodies are matable to form a spool, wherein the longitudinal axes are parallel, the curved surfaces face in opposite directions, and the first and second tabs overlap one another.

8. The cable radius limiter of claim 7, wherein the rear end of each body defines a plurality of fastener holes.

9. The cable radius limiter of claim 8, wherein the front end of each body defines an opening allowing insertion of a tool to access fasteners in the fastener holes.

10. The cable radius limiter of claim 7, wherein the curved surface of each body is defined by a radius.

11. The cable radius limiter of claim 1, wherein each of the first and second tabs of the first body extends in an upward direction, and the third tab extends in a downward direction, when the first body is mounted in a first orientation relative to a generally vertical surface.

12. The cable radius limiter of claim 11, wherein the first body is configured to mount to a generally vertical surface in a number of different orientations.

* * * * *